United States Patent [19]
Hori

[11] Patent Number: 5,835,152
[45] Date of Patent: Nov. 10, 1998

[54] METHOD OF CONVERTING 4:2:0P/4:2:2P PROGRESSIVE SCAN DATA AND CONVERTER

[75] Inventor: Akihiro Hori, Tokyo, Japan

[73] Assignee: Nippon Television Network Corporation, Tokyo, Japan

[21] Appl. No.: 785,948

[22] Filed: Jan. 22, 1997

[30] Foreign Application Priority Data

Jan. 22, 1996 [JP] Japan .................................. 8-008011

[51] Int. Cl.⁶ .............................. H04N 1/22; H04N 7/01; H04N 11/20
[52] U.S. Cl. .......................... 348/455; 348/456; 348/446
[58] Field of Search .................................. 348/455, 456, 348/446, 441, 444, 449, 459, 558; H04N 11/22, 7/01, 11/20

[56] References Cited

U.S. PATENT DOCUMENTS

| | | | |
|---|---|---|---|
| 4,335,393 | 6/1982 | Pearson | 348/455 |
| 5,268,751 | 12/1993 | Geiger et al. | 348/446 |
| 5,457,498 | 10/1995 | Hori et al. | 348/453 |
| 5,677,981 | 10/1997 | Kato et al. | 348/427 |

OTHER PUBLICATIONS

"Proposed SMPTE Standard for Television—720 ×483 Active Line at 59.94–Hz Progressive Scan Production—Bit–Serial Interfaces", SMPTE Journal, published by the Society of Motion Picture and Television Engineers, Inc., vol. 105, No. 4, Apr. 1996, SMPTE 294M, pp. 263–268.

*Primary Examiner*—Mark R. Powell
*Assistant Examiner*—Vivek Srivastava
*Attorney, Agent, or Firm*—Ostrolenk, Faber, Gerb & Soffen, LLP

[57] ABSTRACT

A method for converting 4:2:0p serial data containing a first line multiplexing luminance data and color difference data and a second line multiplexing only luminance data in pairs into 4:2:2 interlaced data comprising steps of: demultiplexing 4:2:0p data into luminance data and color difference data at a predetermined horizontal picture element position on a first line; demultiplexing 4:2:0p data into luminance data at the predetermined horizontal picture element position on a second line; obtaining an arithmetic mean value of the demultiplexed luminance data on a first line and the demultiplexed luminance data on a second line; and generating 4:2:2 interlaced data at the predetermined horizontal picture element position by multiplexing the obtained arithmetic mean value as luminance data and the demultiplexed color difference data in pairs.

5 Claims, 6 Drawing Sheets

METHOD OF CONVERTING 4:2:0P/4:2:2P PROGRESSIVE SCAN DATA AND CONVERTER

BACKGROUND OF THE INVENTION

The present invention relates to an art of converting progressive scan data into interlaced data. More specifically, this invention relates to the technology of converting 4:2:0p or 4:2:2p serial data into 4:2:2 interlaced data described in SMPTE294M.

It is a recent trend that the progressive scan system has been replacing the interlace system conforming to the requirement of high image quality. As a conventional progressive scan system, 8:4:4 system is well known for sampling a luminance signal of 525p analogue signals at 27 MHz and for sampling a color difference signal at 13.5 MHz.

The digital interface of the aforementioned progressive scan system has two types, 4:2:2p system and 4:2:0p system.

The 4:2:2p system contains a pair of interlaced data obtained by demultiplexing the aforementioned 8:4:4 data on each line into an interlacing manner. A line complementing the demultiplexed line is set as another interlaced data. Then they are extended twice on a time axis for two bit-serial interfaces having the same data structure as that of 525 interlace digital component signals sampled at 13.5 MHz, respectively.

The 4:2:0p serial data is generated by filtering only a color difference signal of the aforementioned 8:4:4 data with a vertical low-pass filter and subsample the 8:4:4 data that has been filtered into interlacing manner.

Therefore a luminance signal has progressive scan data at 27 MHz sampling. The color difference signal has interlaced data at 6.75 MHz sampling in 4:2:0p. This 4:2:0p system executes transmission at 360 Mb/s that is the same as the transmission rate executed in the 4:2:2 interlace at 18 MHz sampling. Therefore the 4:2:0p system that can use the equipment or IC originally designed for the 18 MHz sample 4:2:2 system has become the object of attention in the relevant field. However in TV station, all video signals have not been already shifted into the progressive scan system. The conventional interlace system has been used in the TV station as well. In case of simple monitoring, the interlace monitor is usually used in spite of the progressive scan system.

In European countries employing PAL system or SECAM system, standardization of the digital interface of the progressive scan system has been developed. The standard of the system similar to the above-described 4:2:0p and 4:2:2p systems excepting the number of scanning lines is expected to be established.

Accordingly the technology of converting the video data of progressive scan system into the video data of interlace system has been increasingly demanded.

Such technology of converting 4:2:0p data of a frequent use into the interlaced data has been particularly demanded.

SUMMARY OF THE INVENTION

The objective of the present invention is to provide a method of converting 4:2:0p serial data into 4:2:2 interlaced data without deteriorating the video quality.

Another objective of the present invention is to provide a converter for converting 4:2:0p serial data into 4:2:2 interlaced data, having a simple construction and reducing the cost.

Further objective of the present invention is to provide a method for converting 4:2:2p serial data into 4:2:2 interlaced data without deteriorating the video quality.

Still further objective of the present invention is to provide a converter for converting 4:2:2p serial data into 4:2:2 interlaced data, having a simple construction and reducing the cost.

The above objective is achieved by a method for converting 4:2:0p data containing a first line multiplexing luminance data and color difference data and a second line multiplexing only luminance data in pairs into 4:2:2 interlaced data comprising steps of: demultiplexing 4:2:0p data into luminance data and color difference data at a predetermined horizontal picture element position on a first line; demultiplexing 4:2:0p data into luminance data at the predetermined horizontal picture element position on a second line; obtaining an arithmetic mean value of the demultiplexed luminance data on a first line and the demultiplexed luminance data on a second line; and generating 4:2:2 interlaced data at the predetermined horizontal picture element position by multiplexing the obtained arithmetic mean value as luminance data and the demultiplexed color difference data in pairs.

The objective is achieved by a unit for converting 4:2:0p data containing a first line multiplexing luminance data and color difference data and a second line multiplexing only luminance data in pairs into 4:2:2 interlaced data comprising: means for demultiplexing 4:2:0p data into luminance data and color difference data at a predetermined horizontal picture element position on a first line; means for demultiplexing 4:2:0p data into luminance data at the predetermined horizontal picture element position on a second line; means for calculating an arithmetic mean value of the demultiplexed luminance data on a first line and the demultiplexed luminance data on a second line; and means for generating 4:2:2 interlaced data at the predetermined horizontal picture element position by multiplexing the obtained arithmetic mean value as luminance data and the demultiplexed color difference data in pairs.

The objective is achieved by a method for converting 4:2:2p data containing a link A signal and a link B signal into 4:2:2 interlaced data comprising steps of: demultiplexing a link A signal of 4:2:2p data into luminance data and color difference data at a predetermined horizontal picture element position; demultiplexing a link B signal of 4:2:2p data into luminance data and color difference data at the predetermined horizontal picture element position; obtaining luminance data of 4:2:2 interlaced data by calculating an arithmetic mean value of the demultiplexed luminance data of the link A signal and the demultiplexed luminance data of the link B signal; obtaining color difference data of 4:2:2 interlaced data by calculating an arithmetic mean value of the demultiplexed color difference data of the link A signal and the demultiplexed color difference data of the link B signal; and generating 4:2:2 interlaced data at the predetermined horizontal picture element position by multiplexing the obtained luminance data and the calculated color difference data in pairs.

The objective is achieved by a unit for converting data of progressive scan system that converts 4:2:2p data containing a link A signal and a link B signal into 4:2:2 interlaced data comprising: means for demultiplexing a link A signal of 4:2:2p data into luminance data and color difference data at a predetermined horizontal picture element position; means for demultiplexing a link B signal of 4:2:2p data into luminance data and color difference data at the predetermined horizontal picture element position; means for obtaining luminance data as 4:2:2 interlaced data by calculating an arithmetic mean value of the demultiplexed luminance data of the link A signal and the demultiplexed luminance data of the link B signal; means for obtaining color difference data of 4:2:2 interlaced data by calculating an arithmetic mean value of the demultiplexed color difference data of the link A signal and the demultiplexed color difference data of the link B signal; and means for generating 4:2:2 interlaced data at the predetermined horizontal picture element position by multiplexing the calculated luminance data and the calculated color difference data in pairs.

The present invention allows 4:2:0p data or 4:2:2p data to be converted into 4:2:2 interlaced data through simplified steps without giving an adverse influence to the video quality.

The converter of the present invention has a simple construction, resulting in cost reduction.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments of the present invention are explained in detail.

The structure of 4:2:0p serial data (progressive scan data) is described.

The 4:2:0p data comprise a line multiplexing luminance data $Y_1$ and color difference data $C_{BV}$ and $C_{RV}$ combined with a line multiplexing only luminance data $Y_2$ in pairs.

The color difference data $C_{BV}$ and $C_{RV}$ are calculated by band limiting the color difference data CB and CR of the 8:4:4 data vertically to ½ of the luminance data and subsampling at every one line into an interlacing manner.

Figure 1:
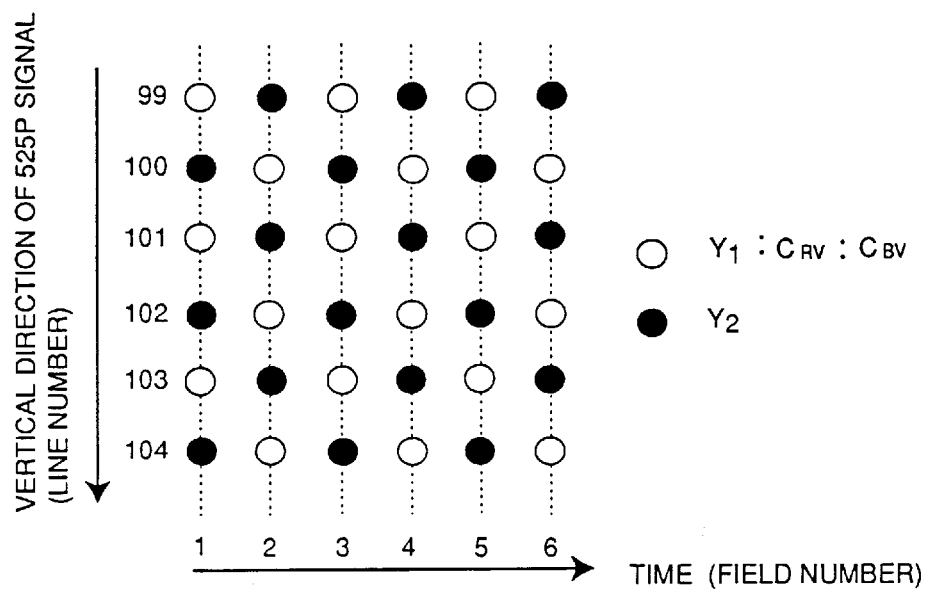
FIG. 1 is a two dimensional figure of a location relationship among luminance data $Y_1$, $Y_2$ and color difference data $C_{BV}$, $C_{RV}$.

FIG. 1 is a two-dimensional figure showing a location relationship among the luminance data $Y_1$, $Y_2$ and color difference data $C_{BV}$, $C_{RV}$. The luminance data $Y_1$ marked as white circles are arranged on each line. That is, in the first field, the luminance data $Y_1$ are arranged on lines 99, 101, 103 and so on. In the second field, the luminance data $Y_1$ are arranged on lines 100, 102, 104 and so on.

The luminance data $Y_2$ marked as black circles are arranged on each line. In the first field, the luminance data $Y_2$ are arranged on lines 100, 102, 104, . . . , 522, 524 and so on. In the second field, the luminance data $Y_2$ are arranged on lines 99, 101, 103, . . . 523, 525 and so on.

While each of the color difference data $C_{BV}$ and $C_{RV}$ has the same sampling point as that of the luminance data $Y_1$ on the line of the white circle. That is, in the first field, the color difference data $C_{BV}$ and $C_{RV}$ are arranged on lines 99, 101, 103 and so on. In the second field, the color difference data $C_{BV}$ and $C_{RV}$ are arranged on lines 100, 102, 104 and so on. Therefore the sampling data of the color difference data $C_{BV}$ and $C_{RV}$ locate at the same position as that in the interlace system. In other words, the color difference data $C_{BV}$ and $C_{RV}$ are arranged on lines 99, 103, 107 and so on in the first field and the color difference data $C_{BV}$ and $C_{RV}$ are arranged on lines 101, 105, 109 and so on in the second field.

Next the video data located in the above-described relationship is described. More specifically, the method of converting 4:2:0p serial data into the 4:2:2 serial data is described.

Figure 2:
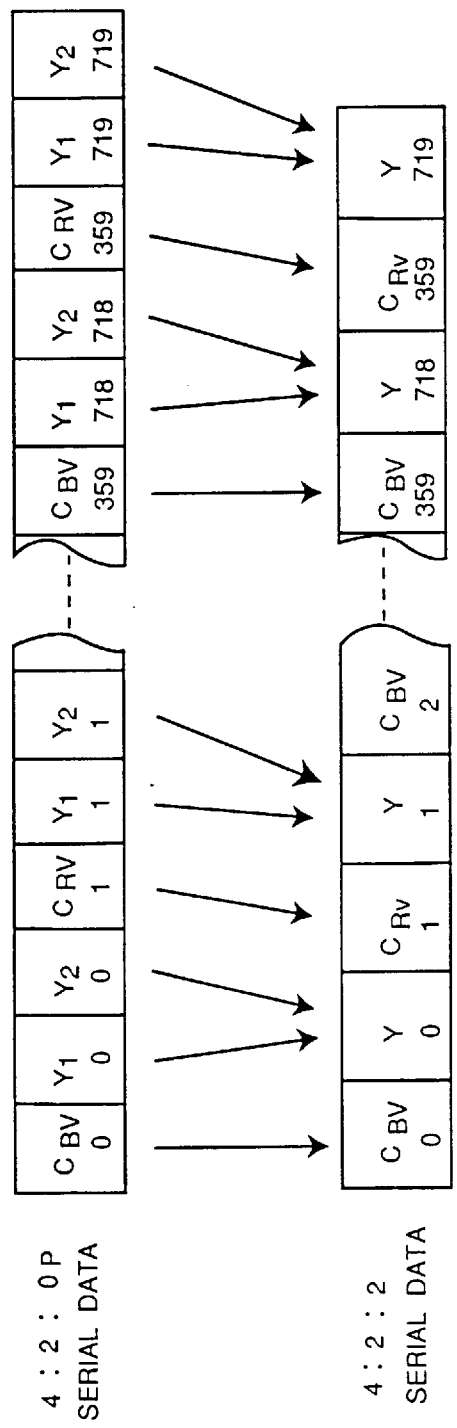
FIG. 2 shows charts each representing 4:2:0p serial data and converted 4:2:2 serial data, respectively.

FIG. 2 shows charts explaining the 4:2:0p serial data and converted 4:2:2 interlaced serial data, respectively.

In the 4:2:0p serial data, a line multiplexing the luminance data $Y_1$ and color difference data $C_{BV}$, $C_{RV}$ is combined with a line multiplexing only luminance data $Y_2$ in pairs and the color difference data $C_{BV}$, $C_{RV}$, the luminance data $Y_1$ and $Y_2$ at the same horizontal picture element position as $C_{BV}$, $C_{RV}$ and $Y_1$ are progressively multiplexed in the order on a transmission package equivalent to one interlaced line period.

For example, the color difference data $C_{BV}$ and the luminance data $Y_1$ at the horizontal picture element position 0 on the line 99 are combined with the luminance data $Y_2$ at the horizontal picture element position 0 on the line 100 in pairs. Then the color difference data $C_{BV}$ and $C_{RV}$ luminance data $Y_1$ and luminance data $Y_2$ are progressively multiplexed in the order on the transmission package equivalent to one interlaced line period. Subsequently the color difference data $C_{BV}$, $C_{RV}$ and the luminance data $Y_1$ at the horizontal picture element position 1 on the line 99 are combined with the luminance data $Y_2$ at the horizontal picture element position 1 on the line 100 in pairs.

The 4:2:0p serial data are generated as aforementioned.

The method for converting the above generated 4:2:0p serial data into the 4:2:2 serial data (interlace) is described.

One of two adjacent lines of 4:2:0p data is set to a first line for multiplexing the luminance data $Y_1$ and the color difference data $C_{BV}$, $C_{RV}$. The other line is set to a second line for multiplexing the luminance data $Y_2$ only.

The first line is combined with the second line in a pair. A pair of the luminance data $Y_1$ and the color difference data $C_{BV}$, $C_{RV}$ on the first line and the luminance data $Y_2$ at the same horizontal picture element position as $Y_1$, $C_{BV}$ and $C_{RV}$ on the second line is demultiplexed from the 4:2:0p serial data.

For example, supposing to combine the lines 99 and 100 in pairs and to set the line 99 as the first line and the line 100 as the second line, pairs of the luminance data $Y_1$ and the color difference data $C_{BV}$ at the horizontal picture element position 0 on the line 99 and the luminance data $Y_2$ at the horizontal picture element position 0 on the line 100 are demultiplexed from the 4:2:0p serial data.

An arithmetic mean value of the luminance data $Y_1$ on the first line and the luminance data $Y_2$ on the second line is calculated. For example, the arithmetic mean value of the luminance data $Y_1$ at the horizontal picture element position 0 on the line 99 and the luminance data $Y_2$ at the horizontal picture element position 0 on the line 100 is calculated.

The calculated arithmetic mean value is set as the luminance data containing 4:2:2 signals. The above-obtained luminance data and the demultiplexed color difference data $C_{BV}$ on the second line are combined in pairs. The color difference data $C_{BV}$ and the calculated luminance data are multiplexed progressively in the order, generating 4:2:2 serial data at a horizontal picture element position 0. For example, the arithmetic mean value of the luminance data $Y_1$ at the horizontal picture element position 0 on the line 99 and the luminance data $Y_2$ at the horizontal picture element position 0 on the line 100 is combined with the color difference data $C_{BV}$ at the horizontal picture element position 0 on the line 99 for multiplexing as shown in FIG. 2. As a result, the 4:2:2 serial data at the horizontal picture element position 0 are generated.

Similarly the 4:2:2 serial data at the horizontal picture element position 1 are generated by using the luminance data $Y_1$ and the color difference data $C_{RV}$ at the horizontal picture element position 1 on the line 99 and the luminance data $Y_2$ at the horizontal picture element position 1 on the line 100.

The luminance data for multiplexing are defined by the arithmetic mean value of the luminance data $Y_1$ and the luminance data $Y_2$. Therefore the location of the luminance data resulting from this calculation is at a center between the first and the second lines imaginarily. Although the luminance data are shifted from the color difference data by a half of one line, the video quality is hardly influenced by such shifting.

A converter of the present invention is described in detail.

Figure 3:
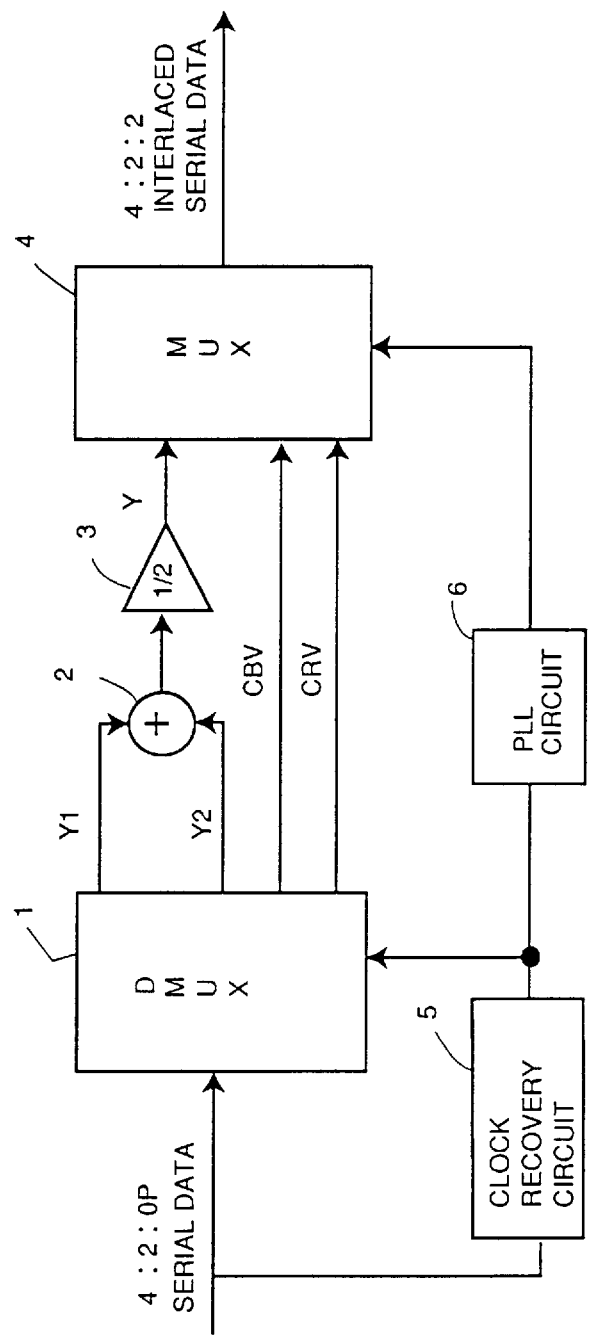
FIG. 3 is a block diagram of a converter that converts 4:2:0p serial data into the 4:2:2 serial data.

FIG. 3 is a block diagram of the converter.

In FIG. 3, a reference numeral 1 is a demultiplex circuit. Upon receiving an input of 4:2:0p serial data, the demultiplex circuit 1 extracts luminance data $Y_1$, color difference data $C_{BV}$, $C_{RV}$ on the first line and the luminance data $Y_2$ at the same horizontal picture element position as $Y_1$, $C_{BV}$, $C_{RV}$ on the second line.

Reference numeral 2 and 3 are an adder and a multiplier, respectively. An arithmetic mean value of the luminance data $Y_1$ and $Y_2$ is calculated by the adder 2 and the multiplier 3. That is, the demultiplexed luminance data $Y_1$ and $Y_2$ are summed up and output by the adder 2. The output of the adder 2 is multiplied by ½ by the multiplier 3 that outputs the arithmetic mean value of the luminance data $Y_1$ and $Y_2$.

A reference numeral 4 is a data multiplex circuit which combines the output from the multiplier 3 (the arithmetic mean value of the luminance data $Y_1$ and $Y_2$) with the color difference data $C_{BV}$, $C_{RV}$ at the same horizontal picture element position as the output in pairs and generates 4:2:2 interlace serial data by multiplexing the color difference data $C_{BV}$, $C_{RV}$ and the luminance data (calculated arithmetic mean value) in the order.

A reference numeral 5 is a clock recovery circuit which extracts a clock at 360 MHz from the input data. A reference numeral 6 is a PLL circuit which generates a clock at 270 MHz synchronized with the input data rate at 360 Mb/s.

A method for converting the 4:2:2p data into the 4:2:2 interlaced data is described.

The structure of the 4:2:2p serial data (progressive scan data) is described first.

In the 4:2:2p system, a pair of interlaced data is calculated by demultiplexing the 8:4:4 video data at every line in an interlacing manner and isolating the line complementing the demultiplexed line as another interlaced data. The respective data are extended twice on the time axis and transmitted as dual-link interface (Link A signal and Link B signal) having the same data structure as that of 525 interlace digital component signals at 13.5 MHz sampling for transmission.

Figure 4:
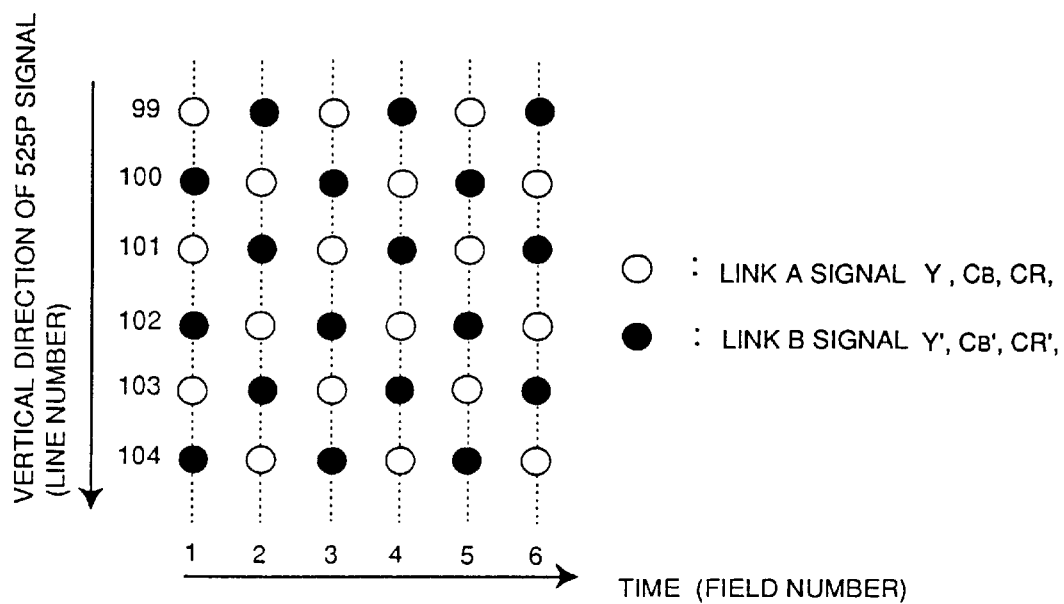
FIG. 4 is a two-dimensional figure of a location relationship between a link A signal and a link B signal in view of vertical-time direction.

FIG. 4 shows a relationship between the link A signal and the link B signal in a vertical-time direction.

As FIG. 4 shows, the link A signal is formed of the luminance data and color difference data on lines 99, 101, 103 and so on in the first field and the luminance data and the color difference data on lines 100, 102, 104 and so on in the second field.

The link B signal is formed of the luminance data and color difference data on lines 100, 102, 104 and so on in the first field and the luminance data and the color difference data on lines 99, 101, 103 and so on in the second field.

The color difference data and the luminance data on each line are sequentially multiplexed in the order from the horizontal picture element position 0 to 719.

The method for converting the 4:2:2p serial data into the 4:2:2 serial data is described.

Figure 5:
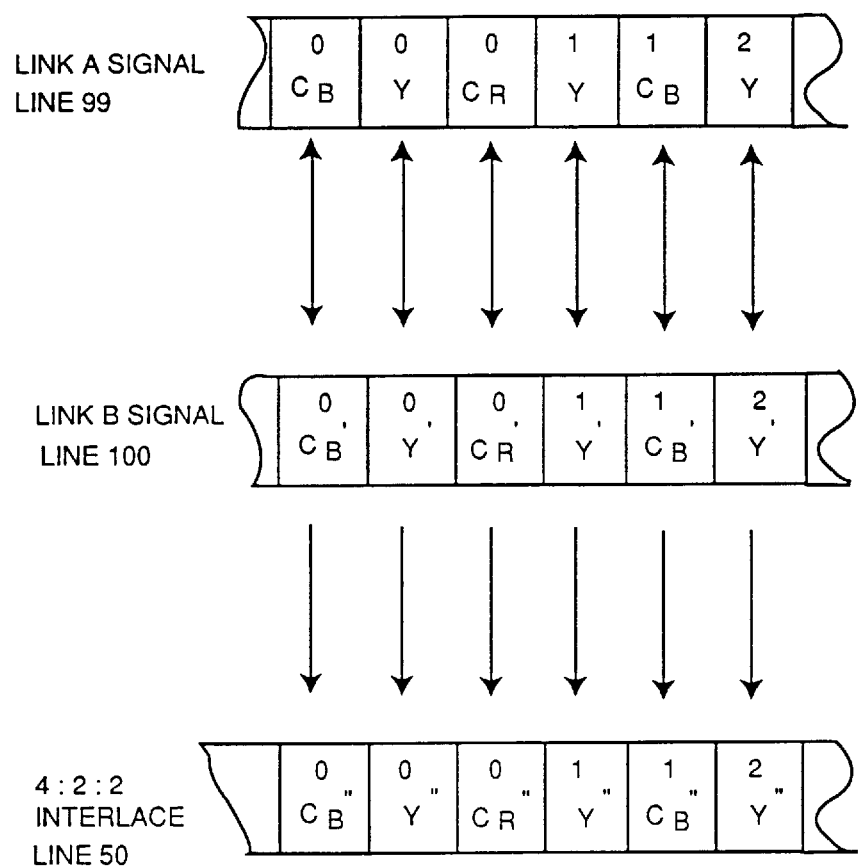
FIG. 5 shows charts each representing 4:2:2p serial data and converted 4:2:2 serial data, respectively.

FIG. 5 shows 4:2:2p transmission data and converted 4:2:2 interlace serial data, respectively.

In the 4:2:2p link A signal, the color difference data CB and the luminance data Y at the horizontal picture element position 0 on the line 99 and then the color difference data CR and the luminance data Y at the horizontal picture element position 1 on the line 99 are arranged in the order progressively.

In the 4:2:2p link B signal, the color difference data CB' and the luminance data Y' at the horizontal picture element position 0 on the line 100 and then the color difference data CR' and the luminance data Y' at the horizontal picture element 1 on the line 100 are arranged in the order progressively.

Based on the aforementioned link A signal and link B signal, the 4:2:2 interlace serial data are generated in the following manner.

An arithmetic mean value of the color difference data CB of the link A signal at the horizontal picture element position 0 on the line 99 and the color difference data CB' of the link B signal at the horizontal picture element position 0 on the line 100 is calculated. The resultant arithmetic mean value is set as the color difference data CB" at the horizontal picture element position 0 on the line 50 in the 4:2:2 interlace. Then an arithmetic mean value of the luminance data Y of the link A signal at the horizontal picture element position 0 on the line 99 and the luminance data Y' of the link B signal at the horizontal picture element position 0 on the line 100 is calculated. The resultant arithmetic mean value is set as the luminance data Y" at the horizontal picture element position 0 on the line 50 in the 4:2:2 interlace. An arithmetic mean value of the color difference data CR of the link A signal at the horizontal picture element position 1 on the line 99 and the color difference data CR' of the link B signal at the horizontal picture element position 1 on the line 100 is calculated. The resultant arithmetic mean value is set as the color difference data CR" at the horizontal picture element position 1 on the line 50 in 4:2:2 interlace. Then an arithmetic mean value of the luminance data Y of the link A signal at the horizontal picture element position 1 on the line 99 and the luminance data Y' of the link B signal at the horizontal picture element position 1 on the line 100 is calculated. The resultant arithmetic mean value is set as the luminance data Y" at the horizontal picture element position 1 on the line 50 in 4:2:2 interlace.

The above generated data are arranged in the order of the color difference data CB", luminance data Y", color difference data CR" and the luminance data Y" as shown in FIG. 5, generating the 4:2:2 interlace serial data.

A converter of the present invention is described in detail.

Figure 6:
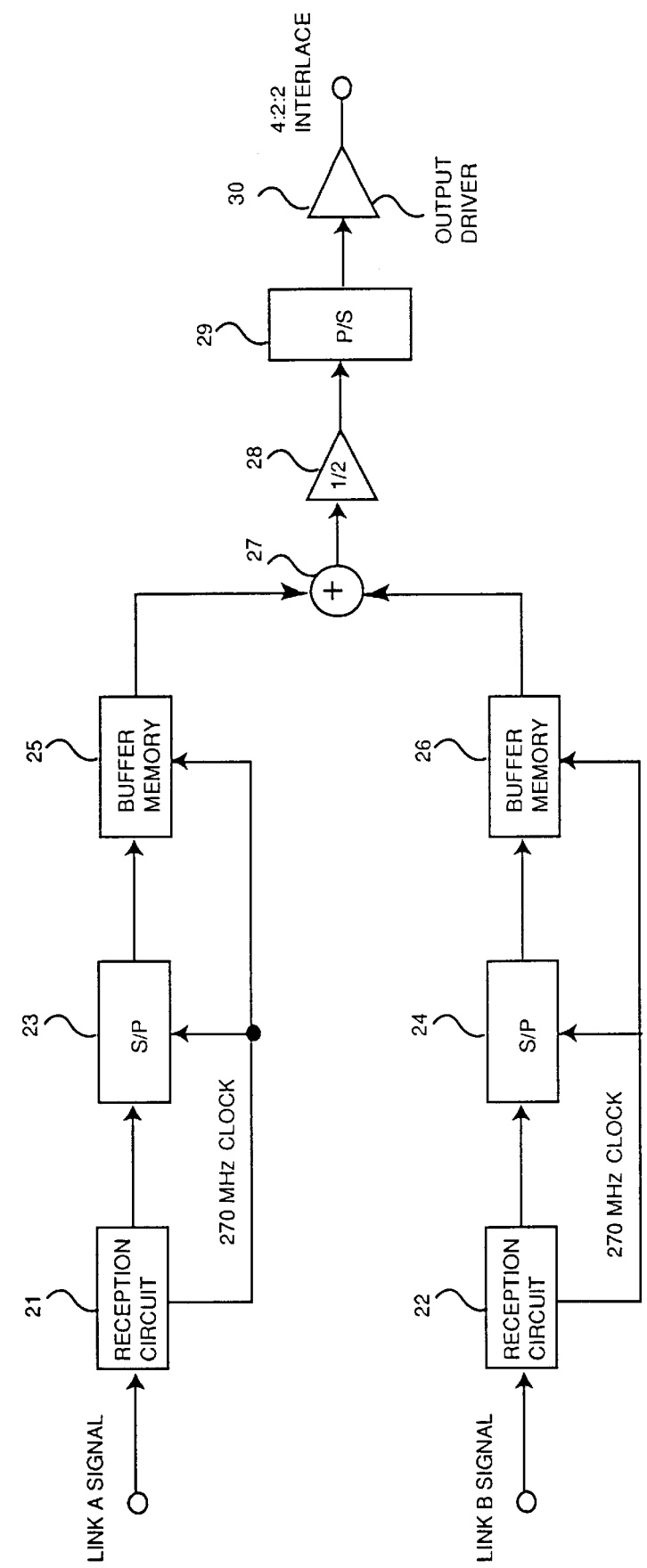
FIG. 6 is a block diagram of a conversion unit that converts 4:2:2p serial data into 4:2:2 serial data.

FIG. 6 is a block diagram of the converter.

In FIG. 6, a reference numeral 21 is a reception circuit for receiving the link A signal. The reception circuit 21 receives the 4:2:2p link A signal and generates a clock at 270 MHz synchronized with the link A signal. A reference numeral 22 is a reception circuit for receiving the link B signal. The reception circuit 22 receives the 4:2:2p link B signal and generates a clock at 270 MHz synchronized with the link B signal.

A reference numeral 23 is a serial-parallel converter for the link A signal. The serial-parallel converter 23 converts serial data of the link A signal received by the reception circuit 21 into 10-bit parallel data based on the clock at 270 MHz.

A reference numeral 24 is a serial-parallel converter for the link B signal. The serial-parallel converter 24 converts serial data of the link B signal received by the reception circuit 22 into 10-bit parallel data based on the clock at 270 MHz.

A reference numeral 25 is a buffer memory for the link A signal. The buffer memory 25 outputs accumulated 10-bit parallel data of the link A signal synchronized with a clock at 270 MHz.

A reference numeral 26 is a buffer memory for the link B signal. The buffer memory 26 outputs accumulated 10-bit parallel data of the link B signal synchronized with a clock at 270 MHz.

That is the buffer memories 25 and 26 output color difference data and luminance data at the same horizontal picture element position.

Reference numerals 27 and 28 are an adder and a multiplier, respectively. An arithmetic mean value of the link A signal and the link B signal is obtained by the adder 27 and the multiplier 28. That is, the color difference data CB, CR of the link A signal are added to the color difference data CB', CR' of the link B signal at the same horizontal picture element position as CB and CR by the adder 27 for outputting. The luminance data Y of the link A signal are also added to the luminance data Y' of the link B signal at the same horizontal picture element position as Y by the adder 27 for outputting. The multiplier 28 multiplies each output of the adder 27 by ½, thus providing the arithmetic mean value of the link A signal and the link B signal.

A reference numeral 29 is a parallel-serial converter for converting the parallel data from the multiplier 28 into serial data.

A reference numeral 30 is an output driver for outputting 4:2:2 serial data.

What is claimed is:

1. A method for converting 4:2:0p data containing a first line multiplexing luminance data and color difference data and a second line multiplexing only luminance data in pairs into 4:2:2 interlaced data comprising steps of:
    demultiplexing 4:2:0p data into luminance data and color difference data at a predetermined horizontal picture element position on a first line;
    demultiplexing 4:2:0p data into luminance data at said predetermined horizontal picture element position on a second line;
    obtaining an arithmetic mean value of said demultiplexed luminance data on a first line and said demultiplexed luminance data on a second line; and
    generating 4:2:2 interlaced data at said predetermined horizontal picture element position by multiplexing said obtained arithmetic mean value as luminance data and said demultiplexed color difference data in pairs.

2. A method for converting 4:2:2p data containing a link A signal and a link B signal into 4:2:2 interlaced data comprising steps of:
    demultiplexing a link A signal of 4:2:2p data into luminanced data and color difference data at a predetermined horizontal picture element position;
    demultiplexing a link B signal of 4:2:2p data into luminance data and color difference data at said predetermined horizontal picture element position;
    obtaining luminance data of 4:2:2 interlaced data by calculating an arithmetic mean value of said demultiplexed luminance data of said link A signal and said demultiplexed luminance data of said link B signal;
    obtaining color difference data of 4:2:2 interlaced data by calculating an arithmetic mean value of said demultiplexed color difference data of said link A signal and said demultiplexed color difference data of said link B signal; and
    generating 4:2:2 interlaced data at said predetermined horizontal picture element position by multiplexing said obtained luminance data and said calculated color difference data in pairs.

3. A unit for converting 4:2:0p data containing a first line multiplexing luminance data and color difference data and a second line multiplexing only luminance data in pairs into 4:2:2 interlaced data comprising:
    means for demultiplexing 4:2:0p data into luminance data and color difference data at a predetermined horizontal picture element position on a first line;
    means for demultiplexing 4:2:0p data into luminance data at said predetermined horizontal picture element position on a second line;
    means for calculating an arithmetic mean value of said demultiplexed luminance data on a first line and said demultiplexed luminance data on a second line; and
    means for generating 4:2:2 interlaced data at said predetermined horizontal picture element position by multiplexing said obtained arithmetic mean value as luminance data and said demultiplexed color difference data in pairs.

4. A unit for converting 4:2:0p data containing a first line multiplexing luminance data and color difference data combined with a second line multiplexing only luminance data in pairs into 4:2:2 interlaced data comprising:
    means for generating a first clock synchronized with 4:2:0p data;
    means for generating a second clock synchronized with 4:2:2 interlaced data based on said first clock;
    means for demultiplexing 4:2:0p data into luminance data and color difference data at a predetermined horizontal picture element position on a first line and luminance data at said predetermined horizontal picture element position on a second line based on said first clock;
    an adder for adding said demultiplexed luminance data on a first line to said demultiplexed luminance data on a second line;
    a multiplier for multiplying an output of said adder by ½; and
    multiplex means for generating 4:2:2 interlaced data at said predetermined horizontal picture element position by multiplexing a pair of luminance data output from said multiplier and said demultiplexed color difference data based on said second clock.

5. A unit for converting data of progressive scan system that converts 4:2:2p data containing a link A signal and a link B signal into 4:2:2 interlaced data comprising:

means for demultiplexing a link A signal of 4:2:2p data into luminance data and color difference data at a predetermined horizontal picture element position;

means for demultiplexing a link B signal of 4:2:2p data into luminance data and color difference data at said predetermined horizontal picture element position;

means for obtaining luminance data as 4:2:2 interlaced data by calculating an arithmetic mean value of said demultiplexed luminance data of said link A signal and said demultiplexed luminance data of said link B signal;

means for obtaining color difference data of 4:2:2 interlaced data by calculating an arithmetic mean value of said demultiplexed color difference data of said link A signal and said demultiplexed color difference data of said link B signal; and means for generating 4:2:2 interlaced data at said predetermined horizontal picture element position by multiplexing said calculated luminance data and said calculated color difference data in pairs.

* * * * *